United States Patent [19]
Calderon

[11] 4,260,016
[45] Apr. 7, 1981

[54] SELF-CLEANING HELICAL SPRING SAND SCREEN

[75] Inventor: Reynaldo Calderon, Houston, Tex.

[73] Assignee: Texaco Inc., White Plains, N.Y.

[21] Appl. No.: 125,417

[22] Filed: Feb. 28, 1980

Related U.S. Application Data

[62] Division of Ser. No. 12,934, Feb. 16, 1979.

[51] Int. Cl.³ .................... B01D 25/34; E03B 3/18; E21B 37/08; E21B 43/08
[52] U.S. Cl. .................................... 166/74; 166/205; 166/231; 210/106; 210/356; 210/497.1; 267/74
[58] Field of Search ............ 166/231, 232, 233, 311, 166/205, 74; 210/497.1, 106, 356, 383, 384; 267/34, 174, 175, 177, 73, 74

[56] References Cited

U.S. PATENT DOCUMENTS

| | | | |
|---|---|---|---|
| 2,569,748 | 10/1951 | Grave | 210/497.1 X |
| 3,179,116 | 4/1965 | Jacobs | 210/497.1 X |
| 3,230,024 | 1/1966 | Gika | 267/177 X |
| 3,754,651 | 8/1973 | Lannoch | 210/356 X |
| 3,901,320 | 8/1975 | Calderon et al. | 166/311 |
| 3,937,281 | 2/1976 | Harnsberger | 166/233 |
| 4,200,150 | 4/1980 | Saadeh et al. | 210/106 X |

*Primary Examiner*—Stephen J. Novosad
*Attorney, Agent, or Firm*—Carl G. Ries; Robert A. Kulason; Theron H. Nichols

[57] ABSTRACT

A self-cleaning helical spring sand screen for use at the petroliferous unconsolidated sand strata of an oil well are disclosed. The sand screen comprises a hydraulically actuated, spring based spool valve connected to the upper end of the sand screen for receiving liquid under high pressure, for storing energy in the spring, for expanding the helical spring sand screen, and for ejecting liquid into the helical spring sand screen for cleaning thereof. Then upon ceasing of flow of the high pressure liquid, the stored energy in another spring contracts the helical spring sand screen for restorating production of sand-free oil from the production tube. A second modification is disclosed.

10 Claims, 4 Drawing Figures

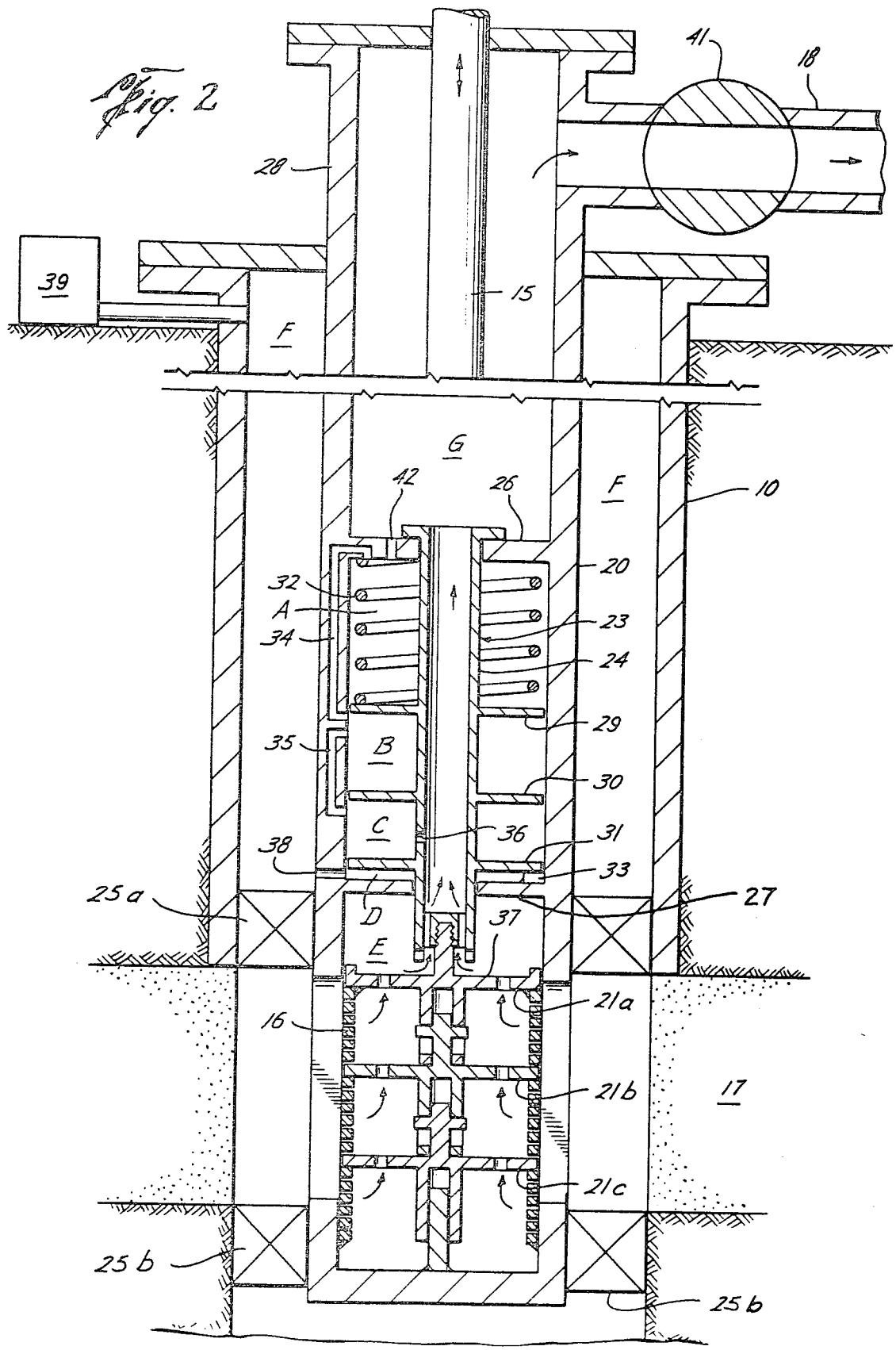

SELF-CLEANING HELICAL SPRING SAND SCREEN

This is a division of application Ser. No. 12,934, filed Feb. 16, 1979.

BACKGROUND OF THE INVENTION

There are many thousands of oil wells over the surface of the earth that are drilled and completed in unconsolidated sand, i.e. crumbly sandstone. In such wells, sand does not necessarily precipitate to the bottom of the well, but instead may remain in suspension and is pumped up, if not free flowing, with the oil. As a result, most mechanical parts as valves, bearings, pistons, cylinders, etc. wear out prematurely under such conditions. Accordingly, the sand must be filtered out from the oil, preferably in the well. Petroleum companies have spent large sums of money in trying to find a suitable solution to the sand problem, but heretofore there has been no satisfactory method or long lasting device for preventing the entry of sand into the tube string and eventually into the suction pipe of the pump, or other works, and for cleaning sand screens quickly without bringing the screen to the surface for cleaning and then returning it to the bottom of the well.

In the construction of the present day sand screen, the mode of operation is such that the sand screen must be replaced for one of two reasons. The first occurs when the sand screen has developed limited flow capacity as a result of screen gauge reduction from plugging or scale build-up. The second occurs when the gauge of the sand screen becomes larger than the original design which allows sand into the production string. The disclosed invention eliminates the need to replace the sand screen when it has limited flow capacity. Thus, the intent of this sand screen cleaning system is to eliminate the cost of loss in production and the cost of re-work operation which include equipment and manpower in removing and replacing a sand screen with limited flow capacity.

U.S. Pat. No. 2,837,032 discloses an oil well foam and wire coil filter, but that filter is quite sophisticated and expensive to manufacture, and is not adjustable to be opened for backwashing a cleaning liquid, as water, to clean the clogged filter. Another attempted solution was a spring filter as disclosed in U.S. Pat. No. 3,754,651, but because no spacers are apparent between the helical filter elements, the elements would have to be held in slight tension to separate the helical filter elements during filtering. Thus that filter could not be used as an oil well filter on which high compressive loads may be placed. Likewise no spring valve can be utilized therein to strengthen the compressive capabilities for converting the filter to one for use in wells. Also, the spring filter of U.S. Pat. No. 3,179,116 is incapable of being strengthened to use in wells. Any compressive force on the triangular spring elements would cause them to collapse, and further the coined depressions for separating the spring elements would cause the spring elements to flex with a load thereon causing displacement of the adjacent coils and variations of the gauge therebetween.

Thus, new and better methods for forming and assembling helical spring sand filters, and better self-cleaning helical spring sand filters are required for mounting on the lower end of a tubing string extending down into a well to the oil containing sand strata.

The disclosed inventions are improvements over those of Assignee's U.S. Pat. Nos. 3,901,320 (166-311) and 3,937,281 (166-233).

OBJECTS OF THE INVENTION

Accordingly, a primary object of this invention is to provide a new and better self-cleaning helical spring sand screen.

A further object of this invention is to provide a self-cleaning helical spring sand screen that is easy to operate, is of simple configuration, is economical to build and assemble, and is of greater efficiency for the filtering of sand out of oil deep in an oil well.

Other objects and various advantages of the disclosed new self-cleaning helical sand screen will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form of the invention wherein like reference numerals designate corresponding parts in the several views in which:

FIG. 2 is a schematic diagrammatic longitudinal cross-section of the self-cleaning helical spring sand screen in the producing position;

Figure 1:
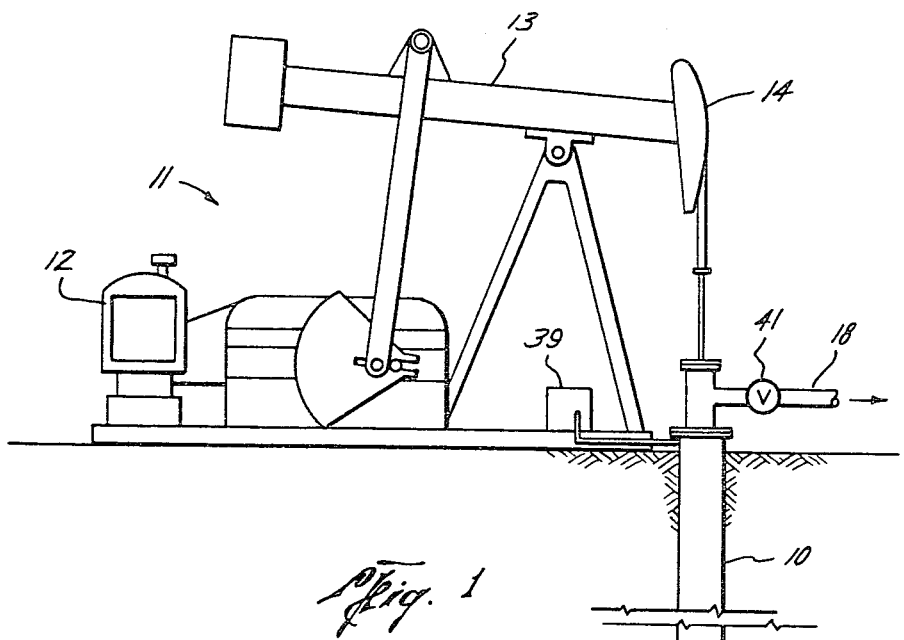
FIG. 1 is a schematic diagrammatic view with parts in section of the new sand screen as mounted in a typical oil well.

The invention disclosed herein, the scope of which being defined in the appended claims is not limited in its application to the details of construction and arrangements of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore all such modifications and variations which are within the spirit and scope of the invention herein are included and only such limitations should be imposed as are indicated in the appended claims.

DESCRIPTION OF THE INVENTION

This patent includes an apparatus comprising a new self-cleaning helical spring sand screen, particularly for use in an oil well.

A self-cleaning helical spring sand screen is disclosed in the drawings that may be made by various methods, as by hand.

FIG. 1 is a schematic diagrammatic view of a typical producing oil well with its casing 10 having pumping equipment 11 comprising motor means 12 for actuating walking beam 13 with horse head 14 for operating pump 15 in the well. A crude oil pump is utilized after free flow has ceased for raising the oil that has passed through the screen 16 from the petroliferous unconsolidated sand 17 up to the surface to exit from production or discharge pipe 18. Except for the valve (23) screen 16 combination, all of the above parts may be conventional elements.

FIG. 2 illustrates a schematic enlarged sectional view of the preferred modification of the new self-cleaning helical spring screen 16 for performing the above described methods. This screen 16, FIG. 2, comprises a helical square spring 19, as shown in Assignee's U.S. Pat. No. 3,937,281, the bottom of which is secured, as by welding, to a valve housing 20. A perforated, helical spring stretching frame 21 supports the helical spring screen comprising interlinked portions 21a, 21b, and 21c. The slot in each of links 21a, 21b, and 21c, consecutively, is made of equal length so that the helical spring will be stretched evenly. The upper end of the spring 19 is secured, as by welding, to lower screen frame portion 21c which is fastened, as with screw threads, for example, to the bottom of a spool valve 23.

While various shapes may be utilized for the wire or bar stock for forming the spring 11, square bar stock is preferred in this case.

Spool valve 23, FIG. 2, is slideable and reciprocal in the portion of the valve housing 20 positioned just above the oil sand strata 17 with upper and lower packers 25a, 25b, respectively.

The spool valve 23 comprises a fluid passage tube 24 with both upper and lower ends slideably mounted in suitable fluid tight seals (not shown) spaced apart upper and lower flanges 26 and 27, respectively, of valve housing 20 for receiving sand-free liquid from the top of the helical spring sand screen 16 and passing it upwards through production tube 28 for emptying from discharge pipe 18 at the surface. Three spaced apart flanges, 29, 30, and 31 are fixed on the spool valve fluid passage tube 24 and have fluid tight sliding contact with the internal walls of the valve housing 20 between its flanges 26 and 27. A compression spring 32 is inserted between the valve housing upper flange 26 and the spool valve upper flange 29 for urging the valve down against a suitable stop 33 where the helical spring sand screen is positioned in a contracted or sand-free liquid producing mode.

For by-passing the liquid to the various chambers formed by the above-identified flanges in the valve housing 20, by-pass passages 34 and 35, FIG. 2, are formed in the valve housing wall. By-pass passage 34 interconnects the upper annular chamber A between flanges 26 and 29 with annular chamber B between flanges 29 and 30. By-pass passage 35 interconnects annular chamber B with annular chamber C. Chamber C likewise has a passage 36 in the wall of the tube 24 for interconnecting the chamber with the fluid passage tube 24. Chamber E is formed between the valve housing lower flange 27 and the upper perforated wall 37 of the helical spring screen perforated frame section 21a. Annular chamber D between flanges 31 and 27 has an interconnecting passage or opening 38 from an outer high pressure liquid annulus F formed between the well casing 10 and the valve housing 20.

At the surface, a pump 39, FIG. 2, is mounted for supplying, when desired, liquid under high pressure to the annulus F. The packer 25a seals the bottom of the annulus so that the only outlet is the passage 38 from the high pressure liquid annulus F to the annular chamber D. A conventional valve 41 is likewise mounted at the top of the production tube 28 in outlet pipe 18 for sealing off the upper end of the production tube, when desired, during backwashing, as will be explained hereinafter.

When the conventional sand screen becomes clogged with sand or other foreign material, it is raised to the top of the well, cleaned, and then lowered again, often requiring a few days to make such a trip. But the disclosed helical spring sand screen is self-cleaning in the bottom of the well in a few moments of high pressure liquid backwashing as shown below.

Briefly, in operation for cleaning of the above described helical spring sand screen after it has gradually become clogged with sand or other foreign material and after having producing sand-free oil, for example, from an unconsolidated petroliferous sand strata 17, FIG. 2, the valve 41 on the production tube discharge pipe 18 is closed and the high pressure pump 39 at the surface is started soon after, if not simultaneously. Liquid under high pressure is pumped down the annulus F and through the opening 38 into chamber D for actuating the spool valve 23 upwardly from the producing position of FIG. 2 to the cleaning position of FIG. 3. As the spool valve 23 is forced upwardly compressing spring 32 in chamber A, the liquid in chamber A passes down through the by-pass passage 34 in the wall of the valve housing into chamber B. Liquid in chamber B passes through the by-pass passage 35 into chamber C. High pressure liquid in chamber C from the beginning of the rise of valve 23 is forced out the passage or openings 36 into tube 24 down into chamber E, and then through the perforated interlinked sections 21a, 21b, and 21c of the screen frame. This reverse flow of high pressure liquid through the helical spring screen 16 squirts the high pressure liquid out backwards through or between the convolutions of the screen for cleaning it with the high pressure liquid by removing all sand and foreign material from therebetween the coils.

After a relatively short period of time, the liquid pressure in chamber A begins to equalize with the pressure in chamber C. This is due to the vent or flow passage 42 between chamber A and the large chamber C forming the upper portion of the production tube, and the compression spring 32 pressing against flange 29 in chamber A to thus force the spool valve 23 downwardly from the position of FIG. 3 to that of FIG. 2. This time period is usually sufficient to provide thorough cleaning of the clogged helical spring sand screen with the high pressure liquid back flow. The above cycle may be repeated, if so desired, until the screen is cleaned adequately and the resistance to flow therethrough is reduced.

Figure 3:
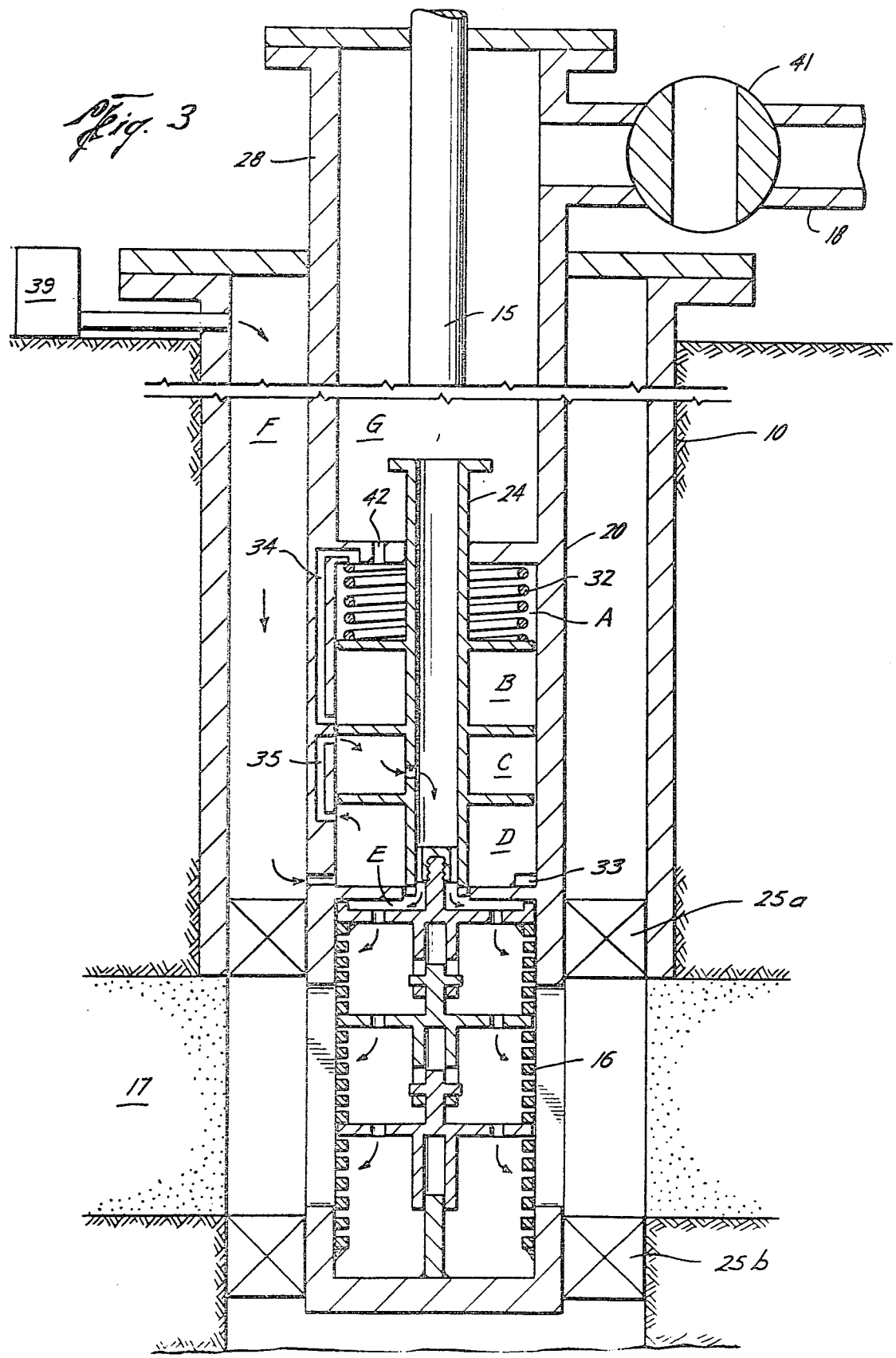
FIG. 3 is a view similar to FIG. 2, but with the helical spring sand screen illustrated in the pressurized and expanded position for spring cleaning.

Likewise, this raising of the spool valve may be accelerated by opening of the production valve 41, FIGS. 2 and 3, and simultaneously shutting down the high pressure pump sooner after the spool valve has reached its lower-most position. As the spring urges the valve down, liquid flows from chamber D both through passage 35 back into chamber C, and back out into the annulus and out on exhaust vent (not shown) at the surface, and from chamber C the liquid flows through passage 35 momentarily to chamber D and then back to chamber B and fluid flows through passage 36 to tube 24, and liquid from chamber B flows through passage 34 back to chamber A, there always being free passage of liquid through passage 42 in the upper valve flange 26.

Figure 4:
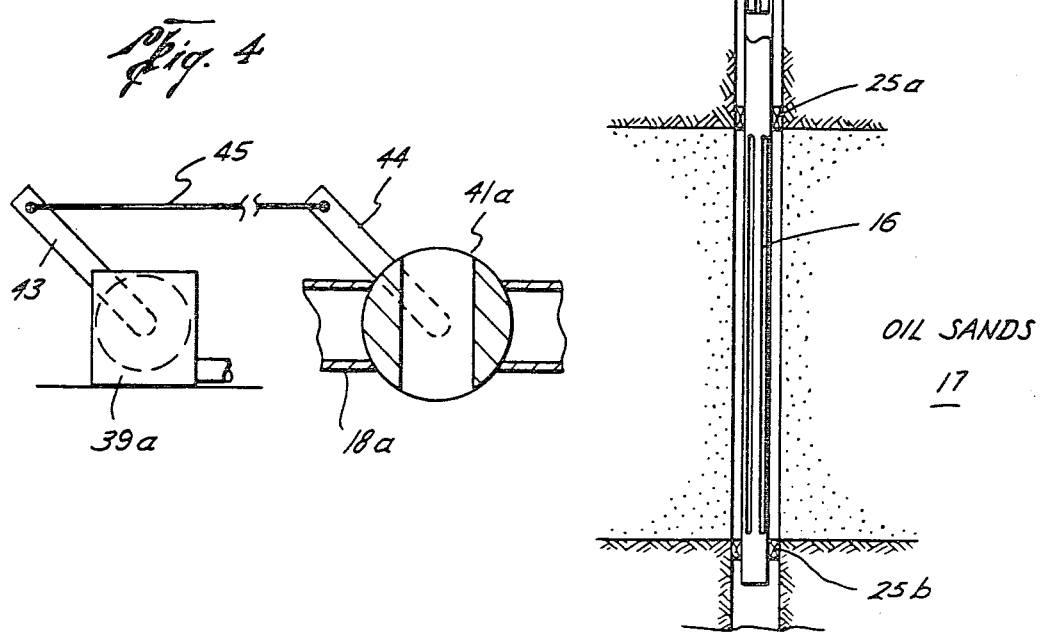
FIG. 4 is a schematic diagrammatic view with parts in section of a modification of FIG. 2.

FIG. 4 is a schematic diagrammatic drawing of a modification of the control system of the self-cleaning helical spring sand spring of FIGS. 2 and 3. Here high pressure pump 39a has a control lever 43 and production valve 41a has a handle 44, both handles being interconnected with a link 45. Thus with 90° counterclockwise rotation of control lever 43 to the position illustrated in FIG. 4, the pump 39a starts pumping and supplying liquid under high pressure and simultaneously valve handle 44 is rotated 90° counter-clockwise from the valve open position to the position illustrated in FIG. 4 to close the production tube valve 41a. Opposite clockwise rotation opens the valve 41a, FIG. 4, and ceases flow of liquid under pressure from pump 39a. Pump control lever 43 of pump 39a, FIG. 4, like in pump 39 of FIG. 2, relieves the pressure in annular chamber F by venting or bleeding off liquid (not shown) when in inactive, no-pumping state.

Obviously other methods may be utilized for cleaning or assembling a helical spring sand screen with the embodiments of FIGS. 2, 3, and 4 than those listed above, depending on the particular well conditions.

Accordingly, it will be seen that while a self-cleaning helical sand screen is new and different, each will operate in a manner which meets each of the objects set forth hereinbefore.

While only one exemplary mechanism has been disclosed, it will be evident that various other modifications are possible in the arrangement and construction of the disclosed self-cleaning helical spring sand screen without departing from the scope of the invention and it is accordingly desired to comprehend within the purview of this invention such modifications as may be considered to fall within the scope of the appended claims.

I claim:

1. A self-cleaning helical spring sand screen comprising,
    (a) helical spring sand screen means for being positioned in a well in an unconsolidated sand strata for producing sand-free liquid from a production tube,
    (b) spring valve means for said helical spring sand screen,
    (c) high pressure liquid source means for said spring valve means, and
    (d) said spring valve means being responsive to said high pressure liquid source means for expanding said helical spring sand screen means for cleaning thereof.

2. A self-cleaning helical spring sand screen as recited in claim 1 wherein,
    (a) said spring valve means has a spring therein for storing energy when expanding said helical spring sand screen, and
    (b) said helical spring sand screen means being responsive to said stored energy in said spring valve means for being contracted after cleaning thereof for producing sand-free liquid from said production tube.

3. A system as recited in claim 2 wherein,
    (a) said spring valve means is responsive to said high pressure liquid source means for compressing said spring and for being opened for passing said high pressure liquid to said helical spring sand screen, and
    (b) said high pressure liquid expands said helical spring sand screen for cleaning thereof.

4. A self-cleaning helical spring sand screen as recited in claim 1 wherein,
    (a) said spring valve means has a spring therein,
    (b) said helical spring sand screen means being responsive to said high pressure liquid source means for compressing said spring, and
    (c) said high pressure liquid source means being responsive to said spring valve means after its spring is compressed for directing high pressure liquid to said helical spring sand screen for expansion and cleaning thereof.

5. A system for cleaning a helical spring sand screen comprises,
    (a) helical spring sand screen means that produces sand-free liquid from a production tube at the surface,
    (b) high pressure liquid source means at the surface,
    (c) closure means for the production tube at the surface,
    (d) valve means having a spring therein connected between said high pressure liquid source means and said helical spring sand screen means, and
    (e) said spring valve means being responsive to said high pressure liquid source means and said production tube closure means for expanding said helical spring sand screen means for cleaning thereof.

6. A self-cleaning helical spring sand screen as recited in claim 5 comprising,
    (a) interconnection means between a high pressure liquid source means valve means and a production tube closure means for opening said valve means for injecting high pressure liquid into the helical spring sand screen for expansion and cleaning thereof by closing action of said interconnected production tube closure means, and
    (b) said interconnection means being means for closing said valve means for stopping the high pressure liquid flow for causing the helical spring sand screen to contract and produce sand-free liquid by opening action of said interconnected production tube closure means.

7. A self-cleaning helical spring sand screen as recited in claim 6 wherein the interconnecting means comprises further,
    (a) a mechanical connection between said high pressure liquid source means valve means and said production tube means for activation of said spring valve means for storing energy simultaneously in a compressing spring means in said spring valve means for expansion and cleaning of said helical spring sand screen.

8. A self-cleaning helical spring sand screen as recited in claim 6 wherein the interconnecting means comprises further,
    (a) a mechanical connection between said high pressure liquid source means valve means and said production tube closure means for actuation of said spring valve means for expending energy simultaneously in a compression spring means in said spring valve means for contracting said helical spring sand screen for producing sand-free liquid from the well.

9. A system as recited in claim 5 wherein said spring valve means is an equal stretching actuator means comprising,
    (a) a plurality of interconnected link means connected between said production tube and said helical spring sand screen means,
    (b) all link means having projections and slots of equal sizes, (c) a projection of each link being positioned in a slot of the adjoining link for providing an equal stretching actuator means for stretching all coils equally of said helical spring sand screen means.

10. An equal stretching actuator means for spreading the coils equally of a helical spring mechanism comprising,
(a) a plurality of interconnected link means connected between a motion actuator at one end and a helical spring mechanism at the other end,
(b) each link means having a projection protruding into a slot of the adjoining link means for providing an equal stretching actuator means for stretching all coils equally of the helical spring mechanism.

* * * * *